United States Patent [19]

Chen et al.

[11] Patent Number: 5,075,687
[45] Date of Patent: Dec. 24, 1991

[54] ECHO SUPPRESSION WITH BOTH DIGITAL AND ANALOG VARIABLE ATTENUATORS

[75] Inventors: Herbert M. Chen; Alan F. Hendrickson, both of Austin, Tex.

[73] Assignee: Advanced Micro Devices, Inc, Sunnyvale, Calif.

[21] Appl. No.: 589,330

[22] Filed: Sep. 27, 1990

[51] Int. Cl.$^5$ ............... H03M 1/06; H04M 9/08
[52] U.S. Cl. .................... 341/110; 341/139; 370/32.1; 379/390; 379/409
[58] Field of Search ............ 341/108, 110, 139; 379/388, 389, 390, 406, 409; 370/32.1

[56] References Cited

U.S. PATENT DOCUMENTS

| | | | |
|---|---|---|---|
| 4,088,851 | 5/1978 | Gupta et al. | 379/406 |
| 4,123,626 | 10/1978 | Munter | 379/409 X |
| 4,600,815 | 7/1986 | Horna | 379/390 |
| 4,629,829 | 11/1986 | Puhl et al. | 379/390 X |
| 4,764,954 | 8/1988 | Tsurusaki et al. | 379/390 |
| 4,965,822 | 10/1990 | Williams | 379/390 |
| 4,979,163 | 12/1990 | Erving et al. | 370/32.1 |
| 4,982,427 | 1/1991 | Nicolai | 379/406 |
| 4,984,265 | 1/1991 | Connan et al. | 379/390 |
| 4,989,242 | 1/1991 | Arnaud | 379/390 |

FOREIGN PATENT DOCUMENTS

| | | | |
|---|---|---|---|
| 61-65630 | 4/1986 | Japan | 379/406 |
| 62-18122 | 1/1987 | Japan | 379/406 |
| 1-155723 | 6/1989 | Japan | 379/406 |
| 1-258537 | 10/1989 | Japan | 379/389 |

OTHER PUBLICATIONS

Fariello, "A digital Echo Suppressor for Satellite Circuits" IEEE Transactions on Communications, Dec. 1972, pp. 1176-1181.

Primary Examiner—Howard L. Williams
Attorney, Agent, or Firm—Foley & Lardner

[57] ABSTRACT

An apparatus for effecting echo suppression facilitating communications between an analog device and a digital device comprising a transmit circuit for processing outgoing signals, a receive circuit for processing incoming signals, and a control circuit for controlling the transmit circuit and the receive circuit. The transmit circuit includes transmit attenuators for attenuating the outgoing signals as they pass through the transmit circuit, and an analog-to-digital conversion circuit for converting analog signals to digital signals. The receive circuit includes receive attenuators for attenuating the incoming signals as they pass through the receive circuit and a digital-to-analog conversion circuit for converting digital signals to analog signals. Each of the transmit attenuators and the receive attenuators is digitally adjustable by the control circuit. The control circuit receives sensed outgoing signals from the transmit circuit and sensed incoming signals from the receive circuit and effects a comparison of the sensed outgoing and incoming signals to determine whether the apparatus is transmitting or receiving. The control circuit digitally adjusts the transmit attenuators and the receive attenuators to distribute a predetermined maximum loss among incoming signals and outgoing signals appropriately to increase signal attenuation in the receive circuit and reduce signal attenuation in the transmit circuit when the apparatus is transmitting, and to increase signal attenuation in the transmit circuit and decrease signal attenuation in the receive circuit when the apparatus is receiving.

8 Claims, 1 Drawing Sheet

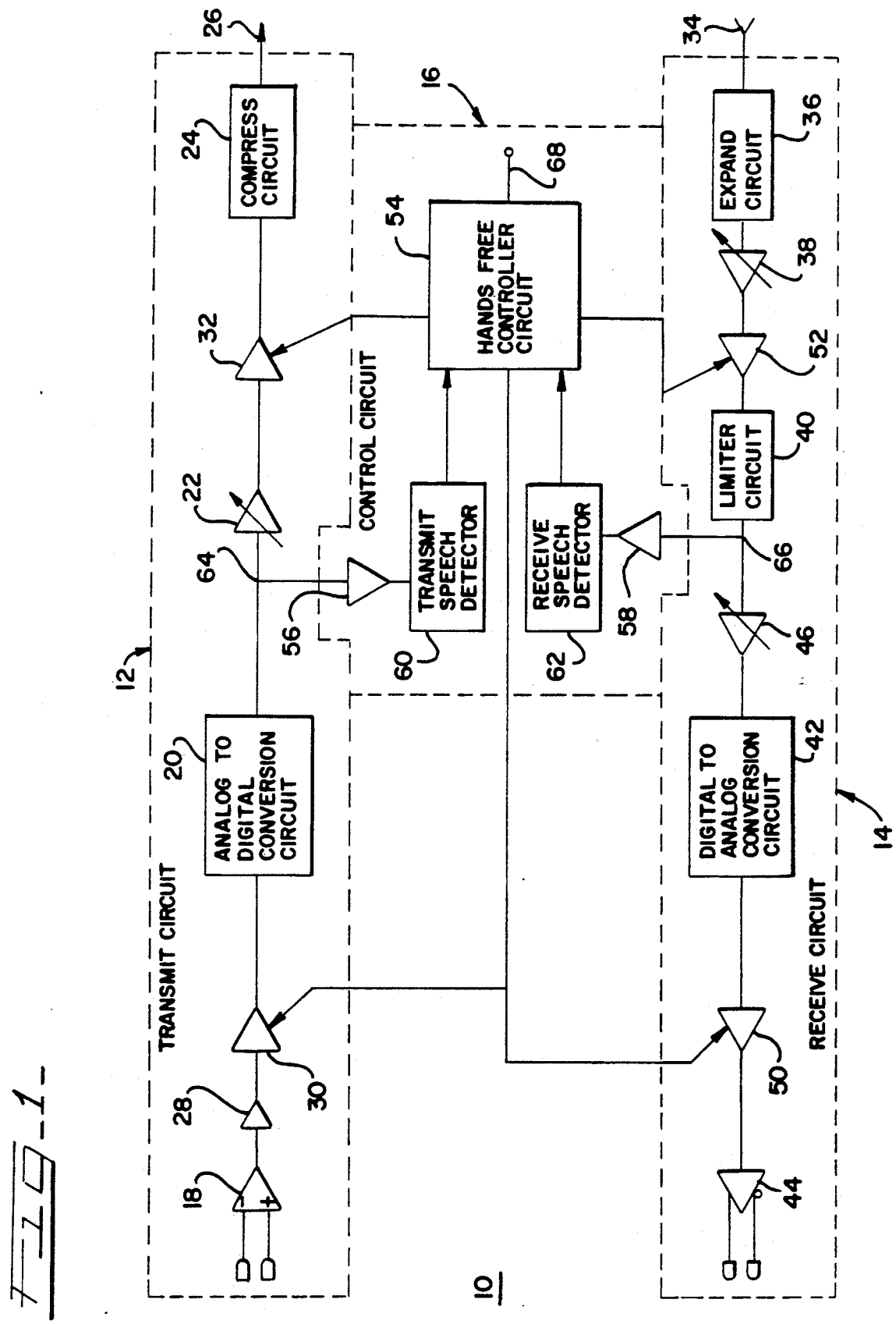

ECHO SUPPRESSION WITH BOTH DIGITAL AND ANALOG VARIABLE ATTENUATORS

CROSS REFERENCE TO RELATED APPLICATIONS

The following applications contain subject matter similar to the subject matter of this application.

U.S. patent application Ser. No. 07/589,402, filed 09/27/90 entitled "Method for Operating an Apparatus for Facilitating Communications" now U.S. Pat. No. 5,021,783 and U.S. patent application Ser. No. 07/589,315, filed 09/27/90 entitled "Apparatus for Discriminating Information Signals from Noise Signals in a Communication Signal".

BACKGROUND OF THE INVENTION

The present invention is directed to an apparatus for facilitating communications. In particular, the present invention is directed to an apparatus for facilitating communications between an analog device and a digital device, such as a hands-free speakerphone controller associated with a telephone system.

A significant portion of telephone equipment manufacturing costs may be attributable to parts and equipment assembly. One approach to reducing costs is to provide a low-cost part which requires no external components. Incorporation of external components into an integrated circuit generally yields a device which is more stable in its operation, has good sensitivity, and is consistent in its performance.

Additional advantages are realized when the integrated circuit is a digital circuit. Principal among such additional advantages are even further improved stability and programmability of various operational parameters associated with the apparatus. Digital programmability provides a versatile apparatus which may be easily tailored to be applicable to a wide variety of operational environments using a single integrated design. As a result, the development costs and manufacturing costs associated with the apparatus are much reduced since they are able to be spread across a wider variety of products.

SUMMARY OF THE INVENTION

The invention is an apparatus for facilitating communications between an analog device and a digital device, which apparatus is adaptable for use as a hands-free controlled speakerphone. The invention comprises a transmit circuit for processing outgoing signals, a receive circuit for processing incoming signals, and a control circuit for controlling the transmit circuit and the receive circuit.

The transmit circuit includes transmit attenuators for attenuating the outgoing signals as they pass through the transmit circuit, and an analog-to-digital conversion circuit for converting analog signals to digital signals.

The receive circuit includes receive attenuators for attenuating the incoming signals as they pass through the receive circuit and a digital-to-analog conversion circuit for converting digital signals to analog signals.

The transmit circuit receives outgoing analog signals from an analog device, such as a microphone, and delivers outgoing digital signals to a digital device, such as a digital telephone network. The outgoing digital signals are representative of the outgoing analog signals received at the microphone. The receive circuit receives incoming digital signals from a digital device, such as a digital telephone network, and delivers incoming analog signals to an analog device, such as a loudspeaker. The incoming analog signals are representative of the incoming digital signals.

Each of the transmit attenuators and the receive attenuators is digitally adjustable by the control circuit. The control circuit receives sensed outgoing signals from the transmit circuit and sensed incoming signals from the receive circuit and effects a comparison of the sensed outgoing and incoming signals to determine whether the apparatus is transmitting or receiving. The control circuit digitally adjusts the transmit attenuators and the receive attenuators to increase signal attenuation in the receive circuit and reduce signal attenuation in the transmit circuit when the apparatus is transmitting, and to increase signal attenuation in the transmit circuit and decrease signal attenuation in the receive circuit when the apparatus is receiving.

In the preferred embodiment of the present invention, the apparatus is an integrated digital circuit having a variety of programmable operational parameters.

It is, therefore, an object of the present invention to provide an apparatus for facilitating communications between an analog device and a digital device which is stable in operation.

A further object of the present invention is to provide an apparatus for facilitating communications between an analog device and a digital device which has good sensitivity and consistent performance.

Yet a further object of the present invention is to provide an apparatus for facilitating communications between an analog device and a digital device which is an integrated digital circuit structure.

A still further object of the present invention is to provide an apparatus for facilitating communications between an analog device and a digital device which has programmable operational parameters, thereby facilitating employment of the apparatus in a variety of operational environments.

Another object of the present invention is to provide an apparatus for facilitating communications between an analog device and a digital device which is inexpensive to manufacture.

Further objects and features of the present invention will be apparent from the following specification and claims when considered in connection with the accompanying drawing illustrating the preferred embodiment of the invention.

DETAILED DESCRIPTION OF THE DRAWING

FIG. 1 is a schematic drawing of the preferred embodiment of the present invention.

DETAILED DESCRIPTION OF THE INVENTION

In FIG. 1, an apparatus 10 for facilitating communications between an analog device (not shown) and a digital device (not shown) is illustrated.

Apparatus 10 includes a transmit circuit 12, a receive circuit 14, and a control circuit 16.

Transmit circuit 12 includes an analog input 18 from an analog device (not shown), such as a microphone or the like, an analog-to-digital conversion circuit 20, a programmable gain amplifier 22, and a compression circuit 24 for compressing digital signals prior to passing the digital outgoing signals to a digital device (not shown), such as a digital telephone circuit, at output 26. Also included in transmit circuit 12 are an analog attenuator 30 and a digital attenuator 32. A booster amplifier 28 is included before analog attenuator 30 to increase the signal-to-noise ratio of the outgoing signal before it is treated by analog attenuator 30 or analog-to-digital conversion circuit 20.

Receive circuit 14 receives digital signals from a digital device (not shown), such as a digital telephone network, at digital input 34. The received digital incoming signal is expanded by an expanding circuit 36 and is amplified by a programmable gain amplifier 38. Also included in receive circuit 14 is a limiter circuit 40 to limit excursion of the digital incoming signal, a digital-to-analog conversion circuit 42, and an analog output 44. Analog output 44 is connected to an analog output device (not shown), such as a loudspeaker, or the like. Also included in receive circuit 14 are an analog attenuator 50 and a digital attenuator 52.

Control circuit 16 includes a hands-free controller circuit 54, an amplifier 56, an amplifier 58, a transmit speech detector 60, and a receive speech detector 62. Thus, control circuit 16 samples outgoing digital signals at junction 64 and samples incoming digital signals at junction 66.

In operation, transmit circuit 12 accepts an outgoing signal as a differential analog input from a microphone (not shown) through analog input 18, performs analog-to-digital conversion of the outgoing signal by analog-to-digital conversion circuit 20, compresses the then-digital output signal by compression circuit 24, and presents the compressed digital output signal at digital output 26. The output signal also passes through analog attenuator 30 and digital attenuator 32, both of which are under control of hands-free controller circuit 54. Booster amplifier 28 boosts the outgoing analog signal level before analog-to-digital conversion circuit 20 performs its analog-to-digital conversion in order to improve conversion performance. Similarly, programmable gain amplifier 22 is placed in transmit circuit 12 before digital attenuator 32 in order that a user may adjust the final signal level of the outgoing digital signal, thereby further allowing for minimization of distortion and noise in the output digital signal produced at digital output 26.

Receive circuit 14 accepts compressed digital incoming signals at digital input 34, expands the incoming digital signal by expanding circuit 36, passes the incoming digital signal through limiter 40, and performs digital-to-analog conversion by digital-to-analog conversion circuit 42 in order to provide an incoming analog signal to a loudspeaker (not shown) through analog output 44. The incoming signals also pass through digital attenuator 52 and analog attenuator 50, both of which are controlled by hands-free controller circuit 54.

A programmable gain amplifier 38 and limiter 40 are placed before junction 66, the point at which incoming signals are sensed by control circuit 16, in order that hands-free controller circuit 54 can fairly compare outgoing transmit signals and incoming receive signal levels.

Programmable amplifier 46 is provided in order to compensate for loudspeaker sensitivity, which measures output loudness for a given electrical input. Programmable amplifier 46 is placed after junction 66, the sensing point for incoming signals for control circuit 16, so that programmable amplifier 46 does not affect one-to-one comparison by control circuit 16 of outgoing signals and incoming signals. Further, programmable gain amplifier 46 is placed before digital-to-analog conversion circuit 42 in order to optimize performance of digital-to-analog conversion circuit 42.

Transmit speech detector 60 samples signals from transmit circuit 12 and receive speech detector 62 samples signals from receive circuit 14. Amplifiers 56, 58 scale transmit signal levels and receive signal levels, respectively. Transmit speech detector 60 and receive speech detector 62 output to hands-free controller circuit 54 their respective scaled sampled transmit and receive signals. Additionally, transmit speech detector 60 and receive speech detector 62 provide to hands-free controller circuit 54 an indication of whether the respective sampled transmit and receive signals comprise a speech signal or a noise signal.

Signals of fairly constant amplitude over a 150 millisecond interval are generally presumed by the preferred embodiment of the present invention to be noise signals.

Hands-free controller circuit 54 accepts the respective scaled sampled transmit and receive signal level information, as well as speech or noise signal type indications, from transmit speech detector 60 and receive speech detector 62. Information thus received is used by hands-free controller circuit 54 to determine allocation of losses among the various attenuators 30, 32, 50, 52.

Hands-free controller circuit 54 provides three stable states and four transitional states of operation for the preferred embodiment of the present invention.

Preferably, the three stable states are idle, transmit, and receive; and the four transitional states are transmit-up, receive-up, transmit-down, and receive-down.

In the transmit stable state, analog attenuator 30 and digital attenuator 32 are forced to zero decibel loss, and analog attenuator 50 and digital attenuator 52 are forced to a programmable maximum loss. In such manner, hands-free controller circuit 54 allows the outgoing signal to pass through transmit circuit 12 without loss (theoretically), while any incoming signal received at digital input 34 is suppressed by subjecting it to a programmable maximum loss.

In the receive stable state, on the other hand, analog attenuator 50 and digital attenuator 52 are forced to zero decibel loss, and analog attenuator 30 and digital attenuator 32 are forced to a programmable maximum loss in order that losses may be distributed to the transmit circuit 12 while allowing (theoretical) loss-free passage of incoming signals through receive circuit 14.

In the idle stable state, each attenuator 30, 32, 50, 52 is forced to one-half the maximum programmable loss. In such a configuration, the apparatus is equally disposed to respond to transmit (outgoing) signals and to receive (incoming) signals.

Throughout operation of the preferred embodiment of the present invention, digital attenuators 32, 52 may be modified according to volume control values programmed in hands-free controller circuit 54.

The four transitional states established by hands-free controller circuit 54 are provided to ensure smooth transitions among the three stable states. During such transitions among the three stable states, losses in each attenuator 30, 32, 50, 52 are incremented or decremented appropriately to effect the correct transition, preferably in a series of 1.5 decibel steps, until a stable state is achieved by apparatus 10.

In the preferred embodiment of the present invention, the losses among the various attenuators 30, 32, 50, 52 are distributed according to several rules: first, losses in analog attenuator 30 and analog attenuator 50 always sum to a constant, which constant is the programmable maximum loss. Further, losses in digital attenuator 32 and digital attenuator 52 sum to the same constant. Such conditions guarantee stability during voice switching operations and assist in ensuring linear analog-to-digital conversion.

Second, at any given time, losses in analog attenuator 30 and digital attenuator 32 are the same and losses in analog attenuator 50 and digital attenuator 52 are the same. This second requirement allows hands-free controller circuit 54 to perform an unbiased comparison of transmit (outgoing) signal levels and receive (incoming) signal levels, thereby simplifying control circuitry within hands-free controller circuit 54.

Total loss control by hands-free controller circuit 54 in each of transmit circuit 12 and receive circuit 14 is split evenly between attenuators 30, 32 and attenuators 50, 52 for several reasons. First, such even distribution of losses allows a two point sensing structure by providing a reliably detectable signal level at junctions 64, 66 in a configuration which is easily stabilized. As an additional benefit, cost of manufacture also decreases because any requirement for additional sensing points is eliminated. Further, even distribution between attenuators 30, 32 and attenuators 50, 52 provides an automatic voice control hysteresis which defines the ability of a receive speaker to override a transmit speaker, and vice versa. Third, such even distribution helps prevent clipping distortion in the analog-to-digital conversion process as well as increases resolution of such conversion. Finally, such even distribution enhances stability of the idle state so that hands-free controller circuit 54 may make an unbiased comparisons of transmit (outgoing) signal levels and receive (incoming) signal levels.

A further advantage of the all-digital circuitry of apparatus 10 is a capability to provide an interface 68 with a microprocessor (not shown). Interface 68 provides access for a microprocessor to automatically monitor the state of hands-free controller circuit 54 and provides access for a microprocessor to force hands-free controller circuit 54 to any given state by a register write to alter operational parameters utilized by hands-free controller circuit 54. It is precisely by such an access as may be provided by interface 68 that a microprocessor may be used to program operational parameters of a given apparatus 10 to adapt apparatus 10 to accommodate different operating environments. That is, change in applicability of apparatus 10 to accommodate different operating environments may be effected through using software to vary performance rather than by changing hardware. Indeed, such programmability allows operational parameters to be changed during the actual operation of a phone. Thus, alteration of operational parameters may, for example, enable the apparatus 10 to function as a normal full-duplex telephone, a simple transmitter, a simple receiver, or in its normal speakerphone function by employing software programming to change operational parameters.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims:

We claim:

1. An apparatus for facilitating communications between an analog device and a digital device, the apparatus comprising:
    a transmit circuit means for processing outgoing signals;
    a receive circuit means for processing incoming signals; and
    a control means for controlling said transmit circuit means and said receive circuit means;
    said transmit circuit means including transmit attenuator means for attenuating said outgoing signals, and an analog-to-digital conversion means for converting analog signals to digital signals;
    said receive circuit means including receive attenuator means for attenuating said incoming signals and a digital-to-analog conversion means for converting digital signals to analog signals;
    said transit circuit means being operatively connected with said analog device and operatively connectable with said digital device, said transmit circuit means receiving outgoing analog signals from said analog device and delivering outgoing digital signals to said digital device, said outgoing digital signals being representative of said outgoing analog signals;
    said receive circuit means being operatively connected with said analog device and operatively connectable with said digital device, said receive circuit means receiving incoming digital signals from said digital device and delivering incoming analog signals to said analog device, said incoming analog signals being representative of said incoming digital signals;
    each of said transmit attenuator means and said receive attenuator means being digitally responsive to said control means;
    said control means being operatively connected with said transmit circuit means and with said receive circuit means, said control means receiving sensed outgoing signals from said transmit circuit means and receiving sensed incoming signals from said receive circuit means;
    said control means effecting a comparison of said sensed outgoing signals with said sensed incoming signals to determine whether the apparatus is transmitting or receiving;
    said control means digitally adjusting said transmit attenuator means and said receive attenuator means to increase signal attenuation in said receive circuit means and reduce signal attenuation in said transmit circuit means when the apparatus is transmitting; and to increase signal attenuation in said transmit circuit means and decrease signal attenuation in said receive circuit means when the apparatus is receiving;
    said transmit attenuator means comprising a transmit analog attenuator means for attenuating analog signals and a transmit digital attenuator means for attenuating digital signals, said receive attenuator means comprising a receive analog attenuator means for attenuating analog signals and a receive digital attenuator means for attenuating digital signals.

2. An apparatus for facilitating communications between an analog device and a digital device as recited in claim 1 wherein said analog-to-digital conversion means is operatively connected intermediate said transmit analog attenuator means and said transmit digital attenuator means, and wherein said digital-to-analog conversion means is operatively connected intermediate said receive digital attenuator means and said receive analog attenuator means.

3. An apparatus for facilitating communications between an analog device and a digital device as recited in claim 2 wherein said sensed outgoing signals are received from intermediate said analog-to-digital conversion means and said transmit digital attenuator means, and wherein said sensed incoming signals are received from intermediate said receive digital attenuator means and said digital-to-analog conversion means.

4. An apparatus for effecting echo suppression in facilitating communication between an analog device and a digital device, the apparatus comprising:
a transmit circuit means for processing outgoing signals;
a receive circuit means for processing incoming signals; and
a control means for controlling said transmit circuit means and said receive circuit means;
said transmit circuit means and said receive circuit means being configured for operative connection with said analog device and with said digital device;
said control means being operatively connected with said transmit circuit means and said receive circuit means;
said transmit circuit means receiving outgoing analog signals from said analog device and delivering outgoing digital signals to said digital device, said outgoing digital signals being representative of said outgoing analog signals, said transmit circuit means including transmit attenuating means for attenuating signals, said transmit attenuating means establishing a transmit loss for at least one of said outgoing analog signals and said outgoing digital signals in response to a transmit attenuation signal from said control means;
said receive circuit means receiving incoming digital signals from said digital device and delivering incoming analog signals to said analog device, said incoming analog signals being representative of said incoming digital signals, said receive circuit means including receive attenuating means for attenuating signals, said receive attenuating means establishing a receive loss for at least one of said incoming digital signals and said incoming analog signals in response to a receive attenuation signal from said control means;
said control means receiving sensed outgoing signals from said transmit circuit means and receiving sensed incoming signals from said receive circuit means, said control means effecting a comparison of said sensed outgoing signals with said sensed incoming signals to determine whether the apparatus is transmitting or receiving, said control means responding to said comparison to generate said transmit attenuation signal and said receive attenuation signal to effect distribution of a predetermined maximum loss between said incoming signals and said outgoing signals, said distribution being appropriate to increase signal attenuation in said receive circuit means and reduce signal attenuation in said transmit circuit means when the apparatus is transmitting, and to increase signal attenuation in said transmit circuit means and decrease signal attenuation in said receive circuit means when the apparatus is receiving;
said transmit attenuating means comprising a digital transmit attenuator and an analog transmit attenuator, and said receive attenuating means comprising a digital receive attenuator and an analog receive attenuator.

5. An apparatus for effecting echo suppression in facilitating communication between an analog device and a digital device as recited in claim 4 wherein said distribution is effected among said incoming digital signals, said incoming analog signals, said outgoing digital signals, and said outgoing analog signals.

6. An apparatus for effecting echo suppression in facilitating communication between an analog device and a digital device as recited in claim 5 wherein said distribution assigns an analog receive loss value to said analog receive attenuator and assigns an analog transmit loss value to said analog transmit attenuator, said analog receive loss value and said analog transmit loss value summing to a constant.

7. An apparatus for effecting echo suppression in facilitating communication between an analog device and a digital device as recited in claim 6 wherein said distribution assigns a digital receive loss value to said digital receive attenuator and assigns a digital transmit loss value to said digital transmit attenuator, said digital receive loss value and said digital transmit loss value summing to a constant.

8. An apparatus for effecting echo suppression in facilitating communication between an analog device and a digital device as recited in claim 5 wherein said distribution assigns a digital receive loss value to said digital receive attenuator and assigns a digital transmit loss value to said digital transmit attenuator, said digital receive loss value and said digital transmit loss value summing to a constant.

* * * * *